JOHN YOUNG, OF AMSTERDAM, NEW YORK.

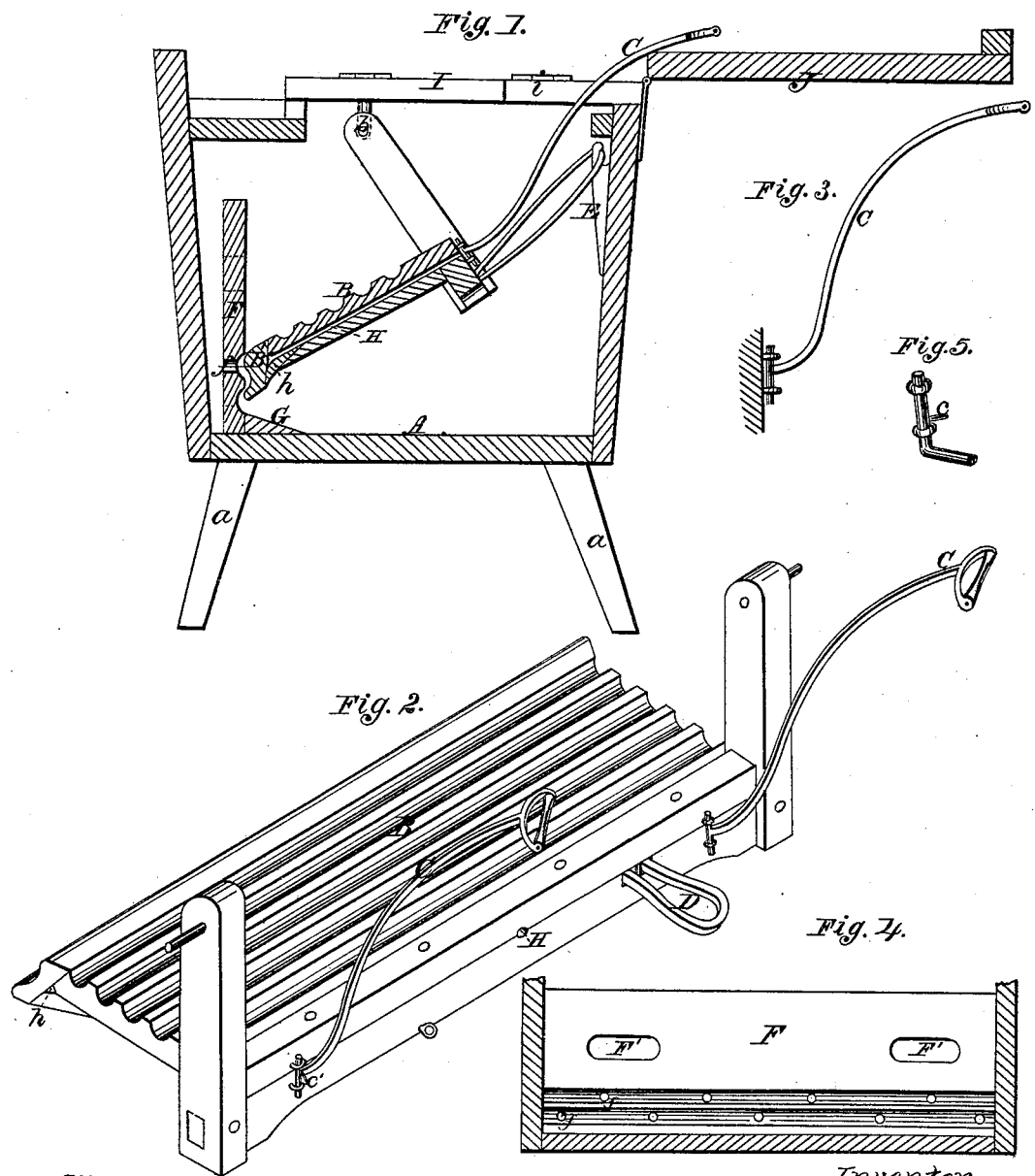

Letters Patent No. 89,000, dated April 13, 1869.

IMPROVED WASHING-MACHINE.

The Schedule referred to in these Letters Patent and making part of the same.

*To all whom it may concern:*

Be it known that I, JOHN YOUNG, of Amsterdam, in the county of Montgomery, and State of New York, have invented new and useful Improvements in Washing-Machines; and I do hereby declare that the following is a full and exact description of the same, reference being had to the accompanying drawings, and to the letters of reference marked thereon.

This invention relates to certain improvements in washing-machines, and consists, first, in the employment of hinged levers which can be folded together within the tub; second, in the employment of a bulkhead of peculiar construction, which is provided with large perforations near its ends, through which the water passes as the machine is operated, and assists in turning the clothes.

The detail of construction and manner of operation will be fully described hereafter.

In the drawings—

Figure 1 is a transverse vertical section of my invention.

Figure 2, a perspective view of the wash-board.

Figure 4, a side elevation of the bulk-head.

Figure 3, a detached view of one of the levers.

Figure 5, a perspective view of a portion of one of the levers.

To enable others skilled in the art to make and use my invention, I will now proceed to describe fully its construction and operation.

A represents the box or case, resting upon the legs *a a*.

B represents the oscillating wash-board, which swings upon bearings at the points *b b* in the case.

C C represent curved levers attached to the top of the wash-board B, as shown by means of the staples. Two forms are shown in the drawings, both of which, however, are arranged so as to turn in together and down upon the board when desired, and thus be out of the way.

To prevent them from turning too far outward when raised, I provide them with the pin *c* or projection *c'*, which serves the purpose of a stop.

D represents a spring by means of which the backward movement of the wash-board is obtained.

E represents a hook attached to the casing, as shown, which may be caught into an eye upon the wash-board when it is desired to make the latter stationary for rubbing clothing with the hand.

The wash-board B is provided upon its lower edge with a foot-piece, B', which is attached thereto at such an angle that when the former is swung forward, the latter will press squarely against the bulk-head at the point of contact. The foot-piece is provided with one or more depressions or flutes which come in contact with corresponding parts of the bulk-head, as shown.

The bulk-head F is provided with small holes *f f*, opening into the depressions which receive the projections of the foot-piece, and has also the large openings F' at each end. It does not extend the entire height of the machine, but is open at the top, as shown.

G represents a corner-piece, which is cut away at each end, to permit the water to be entirely drained off when desired from behind the bulk-head.

H represents an air-tube, which is attached to the back of the wash-board B, and has an opening in its upper part.

This tube extends down the wash-board, and connects with the tube *h*, beneath the foot-piece, which opens at either end of the latter, as shown.

The cover of the machine is made in three parts, the end-pieces I I and middle-piece J. The former, when shut, serve to hold the journals of the wash-board in place.

They are cut away at *i i*, as shown, to permit the necessary movement of the levers.

The operation of my improved machine is as follows:

The case having been supplied with clothing, water, soap, &c., is closed, and the levers operated in the usual manner. As the board moves forward the clothes are also pushed forward by the board and the foot-piece, and up the inclined corner-piece against the bulk-head.

The pressure of the foot-piece against the clothing drives the suds through the perforations in the bulk-head, which carry with them necessarily a portion of the dirt.

The water forced through the perforations in the bulk-head finds vent through the large openings F' F' and thus assists in turning the clothes. These openings are located at the ends of the bulk-head, because the clothing always sticks at these points on account of friction against the sides of the machine.

As the wash-board moves rapidly forward, a vacuum is found in the air-tube behind the foot-piece, to supply which air is drawn in through the tube H.

By this means a current of air is caused to discharge into the suds at each movement of the board.

Having thus fully described my invention,

What I claim as new, and desire to secure by Letters Patent of the United States, is—

1. The levers C C, when provided with the pin *c* or projection *c'*, and arranged so as to be folded within the tub.

2. The bulk-head F, provided with the openings F' at its ends, as and for the purpose described.

3. The combination of the wash-board B, having levers C and foot-piece B', with the bulk-head F' when constructed with perforations F situated at its end, as and for the purpose described.

This specification, signed and witnessed this 10th day of March, 1869.

JOHN YOUNG.

Witnesses:
S. J. NOYES,
E. A. CLARKSON.